United States Patent

Schneeberger et al.

Patent Number: 5,423,288
Date of Patent: Jun. 13, 1995

[54] APPARATUS FOR PRODUCING SEED CRYSTALS

[75] Inventors: Ricardo Schneeberger, Aesch; Hans Horisberger, Muttenz; Rudolf Büttiker, Riehen, all of Switzerland

[73] Assignee: Ciba-Geigy Corporation, Ardsley, N.Y.

[21] Appl. No.: 201,299

[22] Filed: Feb. 24, 1994

[30] Foreign Application Priority Data

Mar. 3, 1993 [DE] Germany ............. 93 810 155.7

[51] Int. Cl.6 ............................................. C30B 35/00
[52] U.S. Cl. .................................. 117/206; 127/15; 117/204; 159/45; 204/157.15
[58] Field of Search ............... 23/295 R; 117/3, 10, 117/30, 204, 206, 222, 914, 925; 127/15; 159/45; 204/157.15

[56] References Cited

U.S. PATENT DOCUMENTS

| | | | |
|---|---|---|---|
| 2,589,310 | 3/1952 | Tournier | 117/206 |
| 2,791,333 | 5/1957 | McKay | 23/295 |
| 2,813,099 | 11/1957 | Weedman | 208/31 |
| 2,863,740 | 12/1958 | Christensen | 117/206 |
| 3,679,371 | 7/1972 | Tisbel et al. | 23/295 |
| 3,694,167 | 9/1972 | Gaillard et al. | 23/295 R |
| 4,578,021 | 3/1986 | Schernutzki | 425/6 |
| 4,588,414 | 5/1986 | Takegami et al. | 23/295 R |

FOREIGN PATENT DOCUMENTS

| | | |
|---|---|---|
| 2634666 | 7/1988 | France . |
| 89551 | 10/1921 | Switzerland . |
| 468202 | 3/1969 | Switzerland . |

OTHER PUBLICATIONS

Derwent 83-777562[40].

Primary Examiner—Robert Kunemund
Assistant Examiner—Felisa Garrett
Attorney, Agent, or Firm—Luther A. R. Hall

[57] ABSTRACT

An apparatus for producing seed crystals in melts has a vertically oriented, closed vessel having a vessel base and having at least one inlet for the melt and having at least one outlet opening for the inoculated melt provided with seed crystals. A preferably annular region of the vessel wall is constructed as a cooling surface. In the interior of the vessel there is arranged a scraping unit which comprises a motor-driven rotating shaft which extends axially through the vessel as far as a point just short of the vessel base. At its end towards the vessel base, the shaft is provided with at least one scraping arm which, starting from the lower end of the shaft close to the vessel base, extends first in the direction towards the vessel wall and thence substantially parallel to the annular cooling surface and axially parallel to the drive shaft. On the scraping arm there are preferably arranged one or more scraping blades which during operation sweep along the inner wall of the vessel in the region of the cooling surface. The scraping unit is heatable. The production of granules, especially of high molecular weight, for example >300, is carried out in a crystallization plant which comprises a supply container for the melt, an apparatus of the afore-described type for producing seed crystals in the melt, and a prill tower in which the inoculated melt provided with seed crystals is sprayed or introduced dropwise into a cooled current of gas. The drops crystallize during their free-fall descent. The granules so produced are discharged at the base of the tower.

10 Claims, 6 Drawing Sheets

APPARATUS FOR PRODUCING SEED CRYSTALS

The invention relates to an apparatus for producing seed crystals in melts. The invention also relates to a crystallisation plant which comprises a pre-crystallisation apparatus of the above mentioned type.

BACKGROUND OF THE INVENTION

Many melts cannot be crystallised using conventional continuous crystallisation plant (cooling rollers, cooling belts) because the crystallisation process takes place too slowly. Such products am often introduced into crystallisation baths or vats where they then crystallise over the course of days or weeks. Crystallisation plant is also known in which granules are produced from so-called two-phase mixtures. In such plant the starting material is enriched with seed crystals in a so-called precrystalliser and the precrystallised melt is then crystallised out on a cooling belt. DE-A-3 209 747 discloses a precrystalliser for producing seed crystals in melts, for inoculating the melt, which is constructed in the form of a horizontal cylindrical heat exchanger. The crystals formed on the cooled outer walls are continuously scraped off by paddles moving over the walls. The paddles are arranged on a rotating shaft which is driven by a motor. The rotating shaft is mounted on both end faces of the horizontal cylindrical heat exchanger. In order to maintain adequate circulation of the melt in the heat exchanger there is additionally provided an external circuit for melt that has already been "inoculated", by means of which a certain meterable portion of the melt that has already been provided with seed crystals is pumped out of the heat exchanger and mixed with the as yet un-precrystallised starting material at the entrance to the heat exchanger.

The precrystalliser described has a very complicated construction. The requirement for two outer be,wings for the horizontal rotating shaft with the paddles and the additional lines and pumps for circulating a portion of melt that has already been "inoculated" means that such apparatus for producing seed crystals in melts is relatively expensive. In addition, such apparatus constructed in the form of a horizontal heat exchanger together with the necessary additional external circuit takes up a relatively large amount of space.

SUMMARY OF THE INVENTION

The problem therefore exists of improving such apparatus for producing seed crystals in melts to the effect that the complexity of the structure and, as a consequence, the cost of such an apparatus are reduced. In addition, the apparatus is also to take up less space than do the known apparatuses, and it is to be suitable for integration into a crystallisation plant especially for starting materials of high molecular weight.

The apparatus according to the invention for producing seed crystals in melts comprises a vertically oriented, closed vessel having a vessel base and having at least one inlet for the melt and having at least one outlet opening for the inoculated melt provided with seed crystals. A preferably annular region of the vessel wall is constructed as a cooling surface. In the interior of the vessel there is arranged a scraping unit which comprises a motor-driven rotating shaft which extends axially through the vessel as far as a point just short of the vessel base. At its end towards the vessel base, the shaft is provided with at least one scraping arm which, starting from the end of the shaft close to the vessel base, extends first in the direction towards the vessel wall and thence substantially parallel to the annular cooling surface and axially parallel to the drive shaft. On the scraping arm there are preferably arranged one or more scraping blades which during operation sweep along the inner wall of the vessel in the region of the cooling surface. The scraping unit is heatable. Preferred embodiments of the apparatus for producing seed crystals in melts are subject of the respective dependent claims.

The crystallisation plant according to the invention comprises a supply container for the melt, an apparatus of the afore-described type for producing seed crystals in the melt and preferably a prill tower for producing the granules. In the prill tower, the inoculated melt provided with seed crystals is sprayed or introduced dropwise into a cooled current of gas. The drops crystallise during their free-fall descent. The granules so produced are discharged at the base of the tower. Preferred embodiments of the crystallisation plant are subject of the respective dependent claims.

BRIEF DESCRIPTION OF THE DRAWINGS

The invention and the details that appear essential will be explained below with reference to the diagrams in which.

DETAILED DESCRIPTION OF PREFERRED EMBODIMENTS OF THE INVENTION

Figure 1:
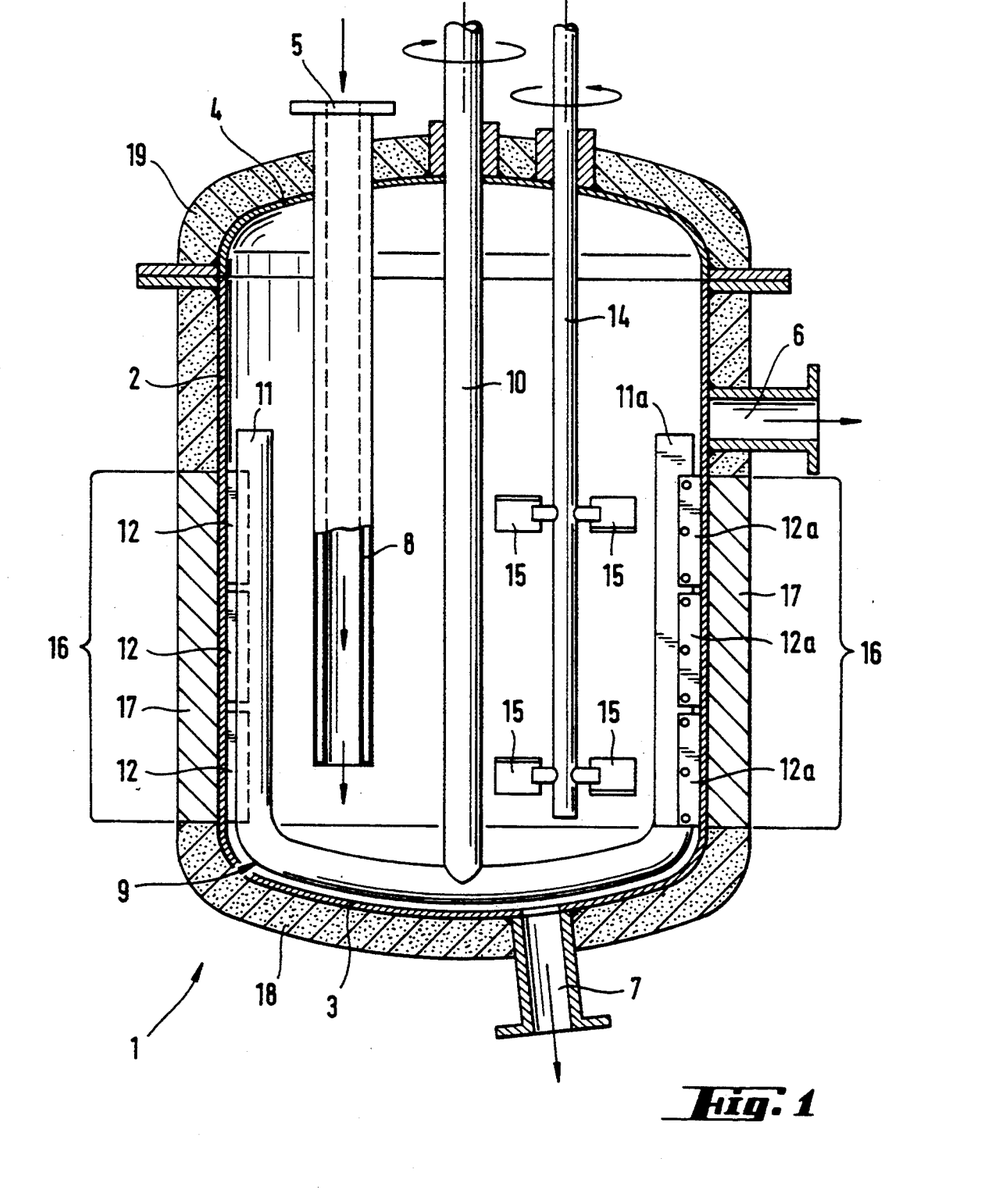
FIG. 1 is an axial section through a first embodiment of the apparatus according to the invention.

In FIG. 1, a first embodiment of the apparatus according to the invention for producing seed crystals in a melt is indicated as a whole by the reference numeral 1. The apparatus 1, referred to as a precrystalliser, includes especially a vertically oriented, closed, preferably cylindrical, vessel 2 having a vessel base 3 and having at least one inlet 5 for the melt and having at least one outlet opening 7 for the inoculated melt provided with seed crystals. In accordance with the embodiment shown in FIG. 1, the vessel 2 has a removable lid 4 which gives access to the interior of the vessel 2. Instead of the removable lid 4 the vessel may also have a vessel base 3 capable of being removed or pivoted away. The outlet opening 7 is provided in the base 3 of the vessel and can be closed by closure means (not shown). The inlet 5 for the melt is provided in the lid 4 of the vessel 2. In the embodiment shown a pipe 8 extends from the inlet 5 in the lid 4 through the interior of the vessel and has its mouth just short of the vessel base 3. The pipe 8 is heatable. The pipe 8 is preferably a double-walled pipe, half of which serves for the supply and the other half of which serves for the removal of a heating medium, for example oil, water, steam or hot air.

In the side wall of the vessel 2 there is arranged an overflow 6 which is connected via a heatable pipeline, for example, to a supply container for tile melt. In this manner, for example, excess melt can flow from the vessel 2 back into the supply container and thus the level in the vessel 2 can be simply regulated, as will be described in more detail below. It will be understood that the inlet 5, the overflow 6 and the outlet opening 7 can be provided with closure devices (not shown).

A preferably annular region 16 of the wall of the vessel 2 is constructed as a cooling surface. For this purpose a region 16 of the vessel wall, extending approximately from the vessel base 3 to approximately 3/5-⅔ of the height of the vessel 2, is cooled. The manner in which that region of the vessel wall is cooled will be dealt with below.

In the interior of the vessel 2 there is arranged a scraping unit 9. The scraping unit 9 comprises a motor-driven rotating shaft 10 which extends axially through the vessel 2 as far as a point just short of the vessel base 3. At its end towards the vessel base, the shaft 10 is provided with at least one scraping arm 11 which, starting from the end of the shaft 10 close to the vessel base, extends first in the direction towards the vessel wall and thence parallel with respect to the annular cooling surface 16 and substantially axially parallel to the drive shaft 10. One or more scraping blades 12 are mounted on the vertical region of the scraping arm 11, which blades during operation cut along the inner wall of the vessel 2 in the region of the cooling surface 16.

In the variant 1 of the apparatus according to the invention shown in FIG. 1 the scraping unit 9 is constructed in the form of a scraping anchor. Two scraping arms 11, 11a are located opposite one another and, starting from the end of the shaft 10 close to the vessel base, extend first in the direction towards the vessel wall and thence parallel with respect to the annular cooling surface 16 and substantially axially parallel to the rotatable shaft 10. During operation, the scraping blades 12, 12a of the two opposing scraping arms 11, 11a sweep along the inner wall of the vessel 2 in the region of the cooling surface 16 and in this manner scrape off the crystals formed on the cooling surfaces. It will be understood that the scraping unit 9 can also have several, preferably up to 4, scraping arms arranged distributed around the circumference at the end of tile shaft 10 close to the vessel base.

Figure 2A:
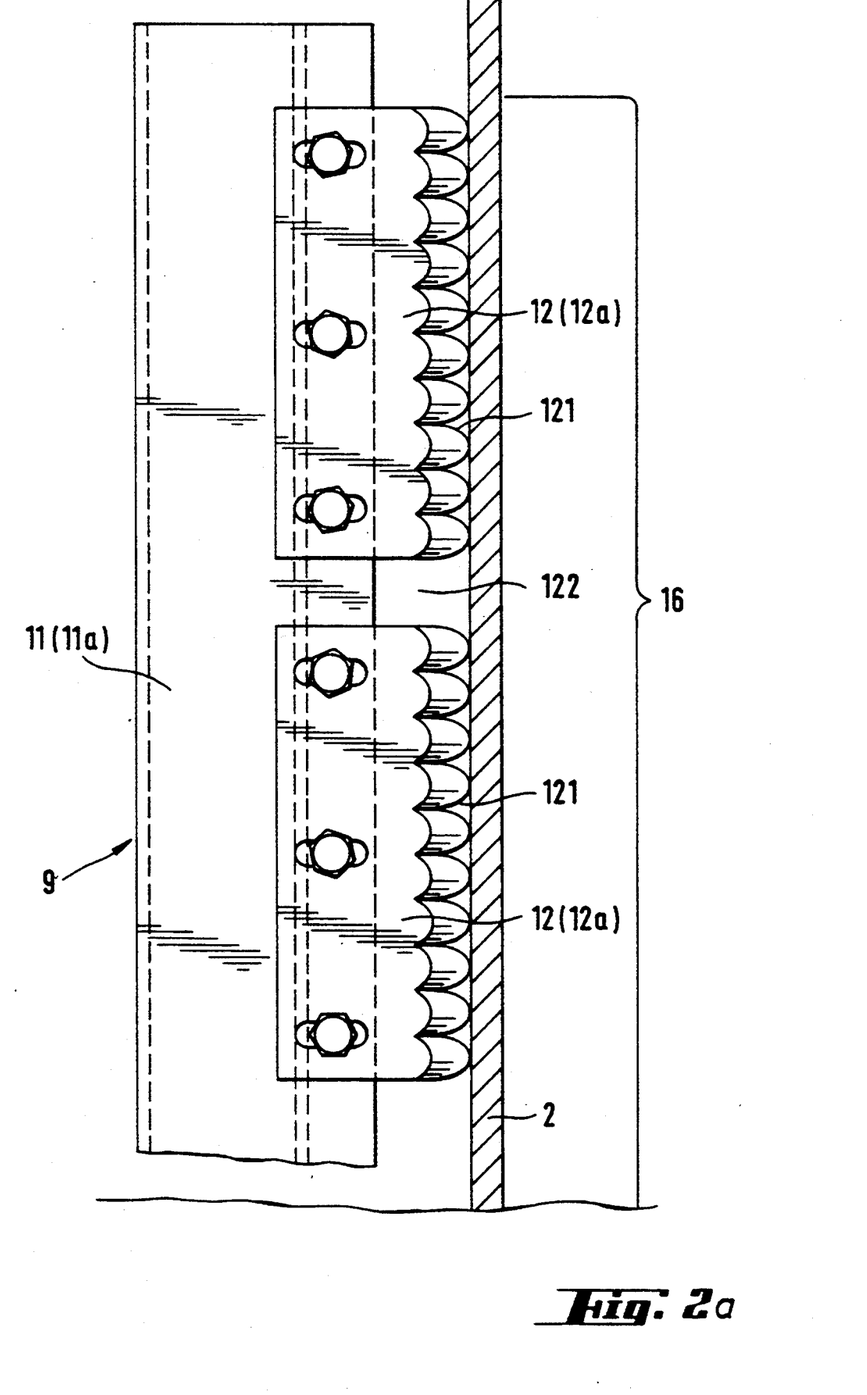
FIGS. 2a–2d are detail views of the apparatus according to the invention.
Figure 2B:
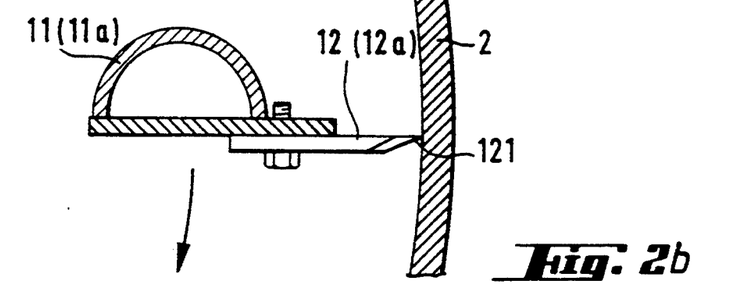
Figure 2C:
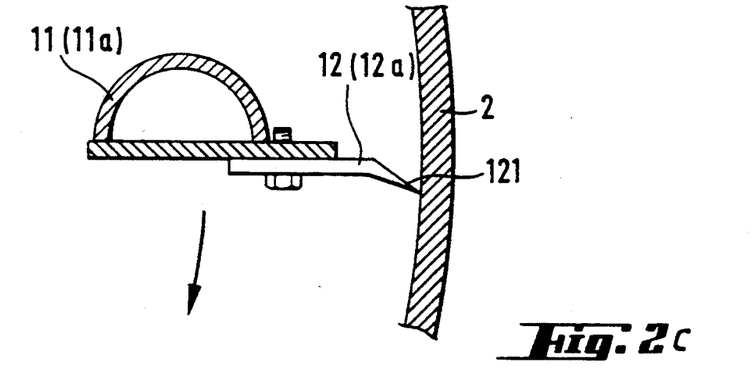
Figure 2D:
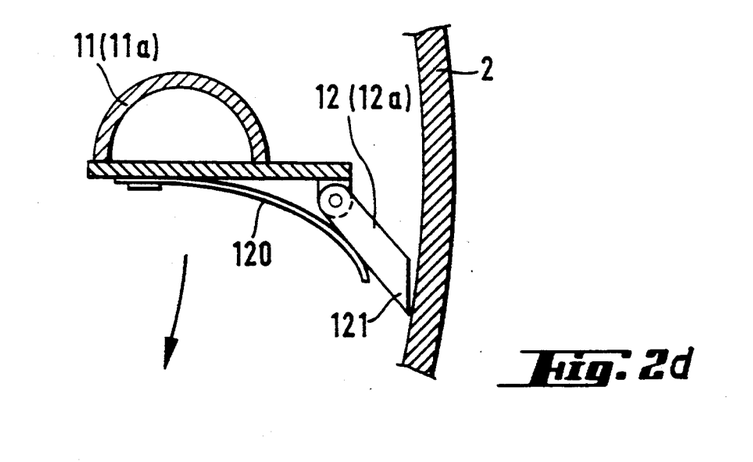

FIGS. 2a to 2d show details of arrangements of the scraping blades 12 on a scraping arm 11. In accordance with FIG. 2a preferably several scraping blades 12 are arranged on a scraping arm 11. Between the individual blades 12 there are small gaps 122 through which the crystals scraped off from the cooling surface 16 can pass more easily into-the body of the melt. The cutter-like forward end 121 of each scraping blade 12 is preferably wavy, which facilitates the scraping off of the crystals. The scraping blades 12 are preferably so attached to the scraping arms 11 that the amount by which they project is adjustable so that irregularities in the wall of the container can be compensated for or the distance of the vertical region of the scraping arm 11 from the cooling surface 16 can be adjusted. For example, for this purpose the blades 12 tire provided with elongate holes and are screwed onto the scraping arms 11. The cutter-like forward ends 121 of the blades 12 can bear radially on the cooling surface 16 (FIG. 2b) or they can be inclined relative to the radial direction (FIGS. 2c and 2d), in which case the angle of inclination of the cutter-like forward ends 121 of a blade 12 is such that during operation tile forward end 121 precedes the scraping arm 11. In an especially preferred variant of the invention the scraping blades 12 on a scraping arm 11 are mounted to be pivotable against the setting force of a spring 120 (FIG. 2d). In this manner irregularities in the vessel wall or the distance between the vertical region of a scraping arm 11 and the cooling surface 16 and therefore the pressure of the blades 12 on the cooling surface 16 can be even better compensated for. Of course, it is also possible for each scraping arm itself to be constructed in the form of a scraping arrangement at its forward end which extends approximately parallel to the cooling surface. That scraping arrangement can, as in the case of scraping blades, have a continuous blade-like scraping edge. The scraping edge is preferably not continuous, however, but, as in the case of the blades arranged at a distance from one another, has gaps through which the scraped-off crystals can pass more easily into the melt.

For the purpose of better distribution in the melt of the crystals scraped off from the annular cooling surface 16 and for the purpose of better agitation of the melt in order that fresh melt is constantly brought into contact with the cooling surface 16, a turbine agitator, preferably a heatable turbine agitator, is provided inside the vessel 2. The turbine agitator comprises a rotatable shaft 14, which extends approximately axially parallel to the scraping unit 9 as far as a point just short of the vessel base. Along the longitudinal extent of the shaft 14, paddles 15 are arranged distributed around the circumference. The turbine agitator 14, 15 is heated, for example, in a manner analogous to the scraping unit 9. The turbine agitator 14, 15 serves not only for the agitation of the melt and for the better distribution of the scraped-off crystals in the melt, but with the aid of the turbine agitator 14, 15 it is also possible to break up relatively large crystal agglomerations in tile melt.

In a preferred variant of the invention, the base 3 of the vessel 2 is constructed to be heatable. As a result, crystallisation of the melt on the inner surface of the base 3 is prevented so that it is not possible for a layer of crystals to be deposited which could exert undesirable axial forces on the scraping unit 9. With this variant the pivot beating of the shaft 10 of the scraping unit 9 can be less strongly constructed, which reduces the cost of the plant. In a preferred variant of the apparatus according to the invention, the region of the vessel 2 above the cooling surface 16 is also heatable. For heating purposes, in accordance with FIG. 1, the corresponding regions of the vessel 2, that is to say the base 3 of the vessel 2 and the region of the vessel 2 above the cooling region 16, are clad with heating jackets 18, 19 which can preferably be kept at a desired temperature with the aid of liquid heating media. It is also possible, however, for electrically operable heating jackets to be provided. The region of the vessel 2 that is cooled in order to form the annular cooling surface 16 in the interior of the vessel 2 is, for example, surrounded by a cooling jacket 17. The temperatures of the heating jackets 18, 19 and of the cooling jacket 17 can be regulated in accordance with the nature of the melt.

In order to prevent crystals being deposited on the scraping unit, the scraping unit 9 is heatable. In accordance with FIG. 1, for this purpose the shaft 10 is constructed, for example, in the form of a hollow shaft and the scraping arms 11, 11a are also hollow. The scraping unit 9 is in this case heated by a liquid heating medium, preferably water, which is introduced via the hollow shaft 10.

Figure 3:
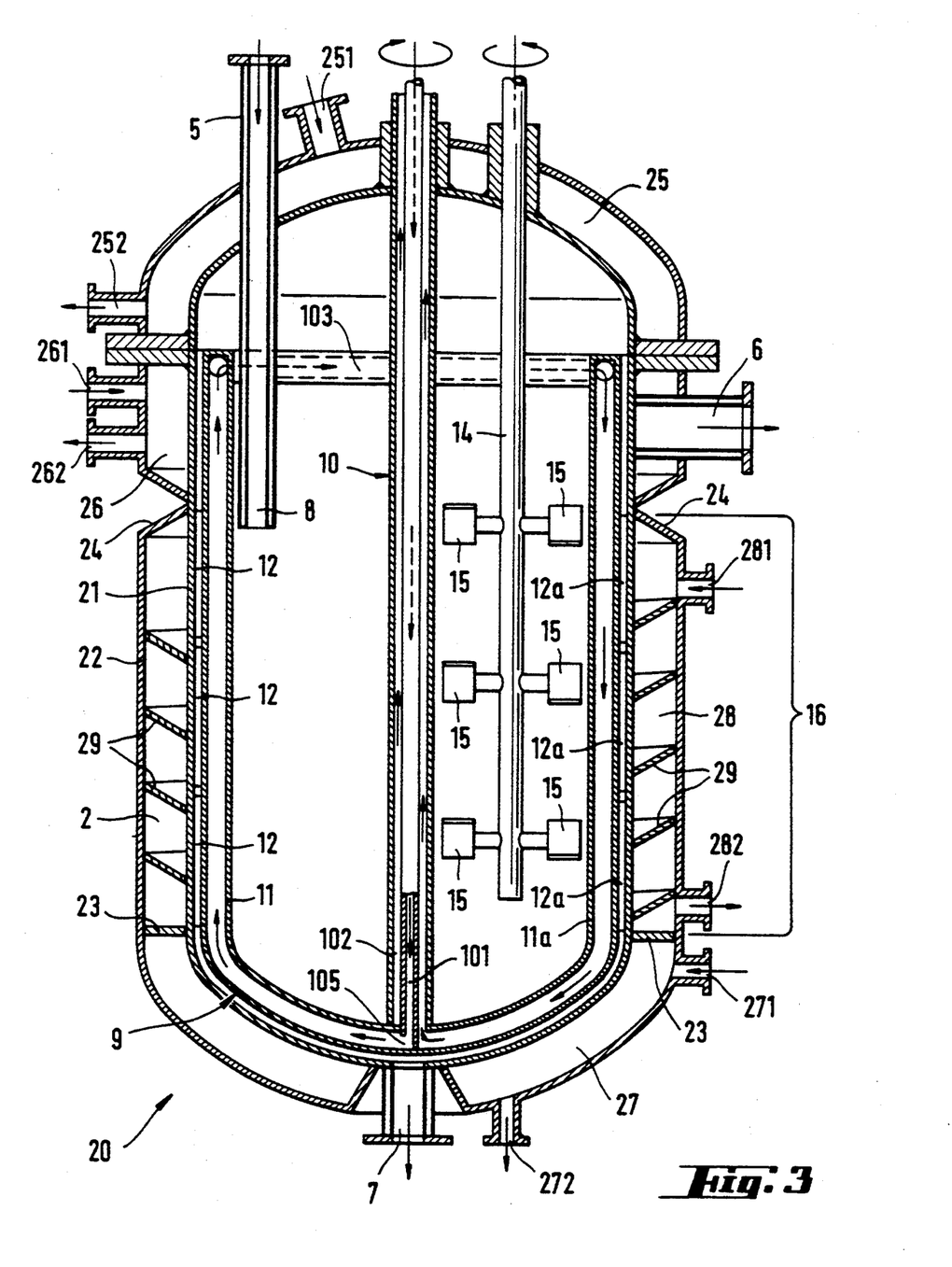
FIG. 3 is an axial section through a second embodiment of the apparatus according to the invention.

The embodiment 20 of the apparatus according to the invention shown in FIG. 3 differs from that described with reference to FIG. 1 mainly with regard to the heating and cooling devices for the corresponding regions of the vessel 2 and of the scraping unit 9 that are to be heated or cooled. In this embodiment, which is shown in diagrammatic form, the vertically oriented closed vessel 2 has a double-walled jacket with two vessel walls 21, 22. The heatable and coolable regions 25, 26, 27, and 28 of the vessel 2 are separated from one another, for example, by walls 23, 24. Each of those regions is provided with an inlet and with an outlet for a heating medium or cooling medium, as the case may be. In the view shown, the inlets are indicated by the reference numerals 251, 261, 271, and 281 and the outlets accordingly by the reference numerals 252, 262, 272, and 282. The heating medium or cooling medium is conducted into the corresponding heating and cooling regions 25, 26, 27, and 28, for example by means of guide plates 29, as shown in FIG. 3 in cooling region 28. Guided in this manner the heating medium or cooling medium is able to pass uniformly to all pans of the respective heating or cooling region. Heating media that may be used are, for example, heat transfer oil, water, steam or hot air. Cooling media that may be used are, for example, water, cooling brine or air. As in the case of the electrically operable heating or cooling jackets in FIG. 1, in this embodiment of the invention also the temperature in the individual heating and cooling zones can be regulated in accordance with requirements.

In the embodiment 20 of the apparatus according to the invention shown diagrammatically in FIG. 3 the heatable scraping unit 9 has a rotatable shaft 10 which is constructed in the form of a double-walled pipe. An inner axial channel 101 is surrounded by an annular outer channel 102. At the end of the shaft 10 close to the vessel base, a connection piece 105 passing from the inner channel 101 through the outer channel 102 opens into the scraping arm 11 which is of hollow construction. At the upper end of the vertical portion of the scraping arm 11 there is provided a hollow connection piece 103 which is connected to the upper end of the vertical portion of the hollow second scraping arm 11a. The second scraping arm 11a finally opens into the outer annular space 102 of the shaft 10 in the region of the shaft close to the base. In this way a circuit is provided for the heating medium which is introduced into the scraping unit 9 through the inner channel 101 and from there passes through the connection piece 105 into the channel of the hollow scraping arm 11. The heating medium rises up the vertical region of the scraper 11, passes into the hollow connection piece 103 and from there into the channel of the second hollow scraping arm 11a. From there it passes into the outer annular space of the shaft 10 and can be conveyed back to a heating medium reservoir.

Figure 4:
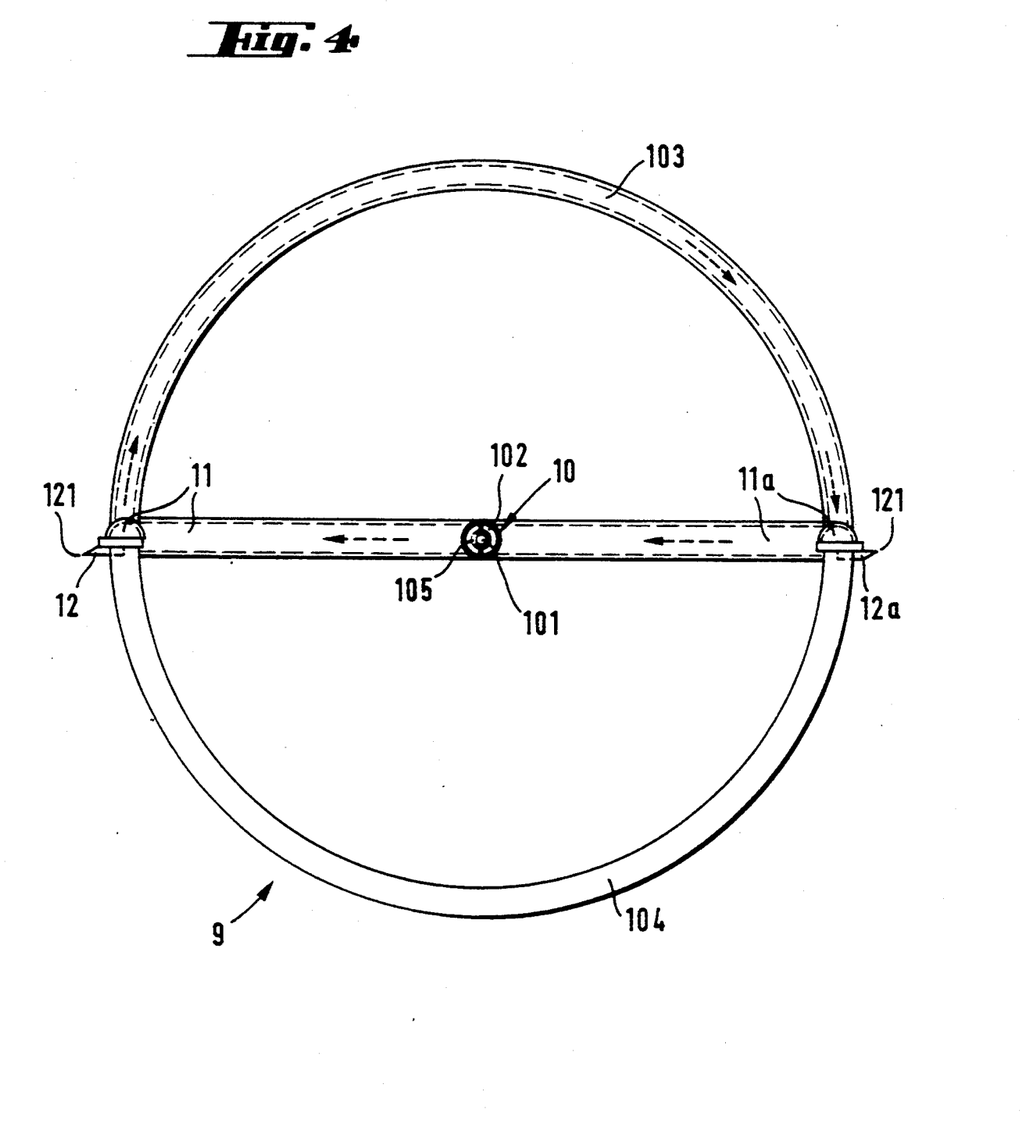
FIG. 4 is a detail view of a scraping unit.

As shown in FIG. 4, the connection piece can be of approximately semi-circular construction. For reasons of rigidity the upper ends of the vertical regions of the scraping arms 11, 11a can also be connected to a further, preferably semi-circular, reinforcement 104. In plan view (FIG. 4) the connection piece 103 and the reinforcement 104 form an approximately circular structure. The shaft 10, constructed in the form of a double-walled pipe, extends through the centre of the structure; the hollow scraping arms 11, 11a extend radially on both sides of the shaft 10 to the connection piece 103 and to the reinforcement 104. The reinforcement 104 can also be hollow and can be connected to the channels in the scraping arms 11, 11a. A heating medium can then be circulated both in the connection piece 103 and in the reinforcement 104, in order to prevent incrustation.

Preferably, however, the connection piece 103 and the reinforcement 104 are arranged above the overflow 6. As a result it is ensured that they do not come into contact with the melt, so that crystals cannot be deposited on the surfaces.

During operation, the liquid product melt is introduced into the vessel 2 via the inlet 5. Care is taken that the temperature of the melt is always kept above the melting temperature of the product. When a portion of the melt comes into contact with the cooling surface 16, partial crystallisation is initiated and the crystals formed are deposited on the cooling surface 16. The scraping blades 12, 12a on the scraping arms 11, 11a of the rotating scraping unit 9 slide along the cooling surface 16 and continuously scrape off the crystals formed from the cooling surface 16. The melt is agitated by means of the turbine agitator 14, 15 so that the scraped-off crystals are mixed thoroughly with the melt, and fresh melt comes into contact with the cooling surface. At the same time, with the aid of the turbine agitator 14, 15 any relatively large agglomerations which may have been formed are broken up again. By heating the scraping unit 9 and its drive shaft 10, the scraping arms 11, 11a, the inlet pipe 8 for supplying melt close to the base, and, preferably, the turbine agitator 14, 15, the base 3 of the vessel 2 and all the regions of the vessel 2 that are not to be cooled, it is ensured that crystallisation is initiated only on the cooling surface and no incrustation can be formed on the scraping unit 9, the inlet pipe 8, the vessel base 3 or on the turbine agitator 14, 15. In addition, it is also ensured that the temperature of the product melt is kept above the melting temperature of the product. Care is taken, however, when controlling the temperature of the melt and the resulting crystal slurry, that crystals that have already been formed are not destroyed again. The temperature of the melt is therefore preferably kept at only just above the relevant melting temperature. The crystal slurry formed is usually pumped away through the outlet opening 7 in the base 3 of the vessel 2 for the purpose of further processing.

The apparatus can be operated batchwise: the vessel 2 is first filled with the product melt, then crystals are formed for a certain period of time before the crystal slurry is pumped out of the vessel again. The process is then repeated with fresh product melt. The apparatus according to the invention is, however, preferably operated continuously or at least quasicontinuously. In quasi-continuous operation, at least the outlet opening 7 is periodically closed and opened again. In continuous operation product melt is continuously supplied and also continuously removed from the vessel 2.

Figure 5:
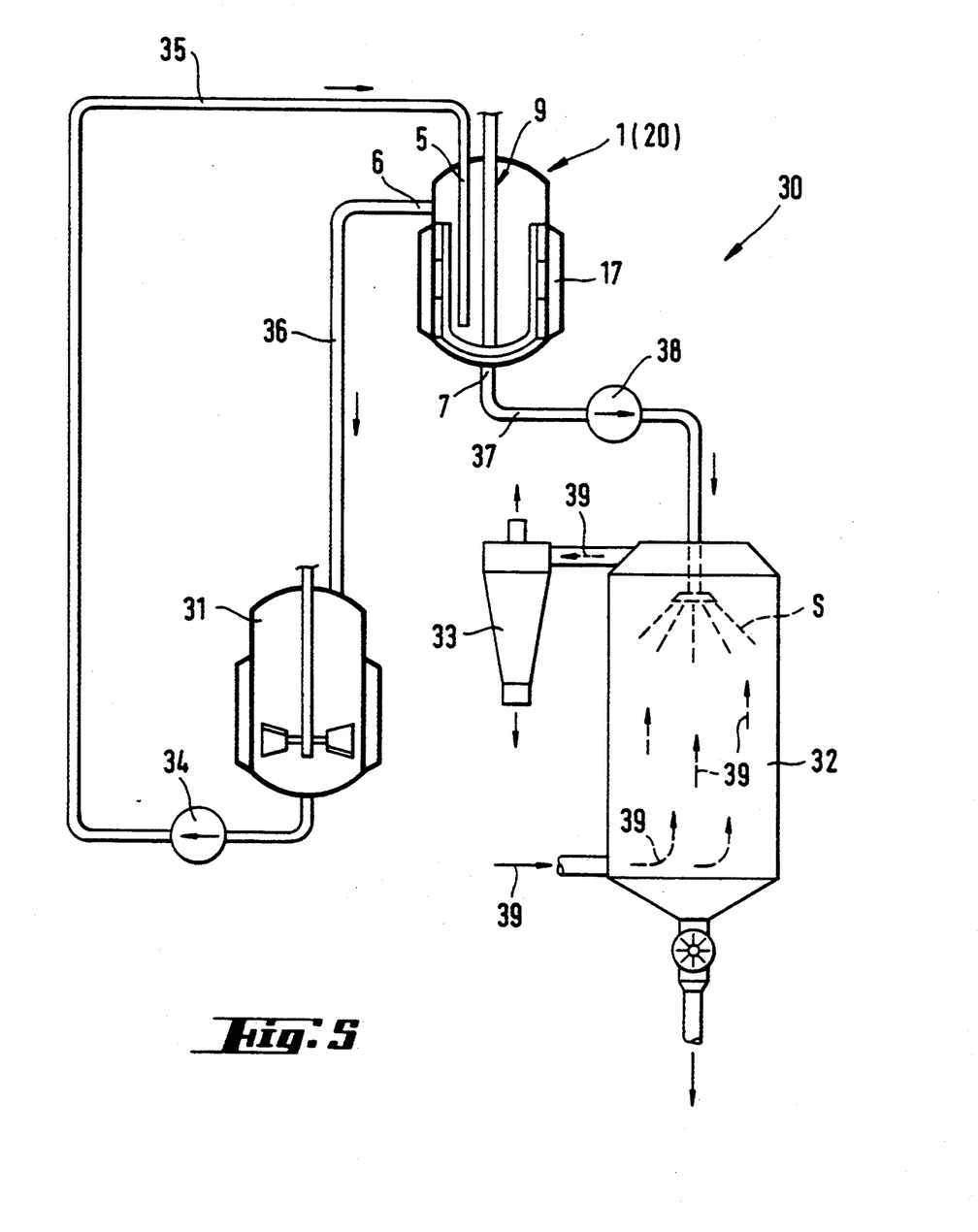
FIG. 5 shows an embodiment of a crystallisation plant according to the invention.

A crystallisation plant 30 according to the invention is shown diagrammatically in FIG. 5. It comprises a supply container 31 for the melt, an apparatus for producing seed crystals in the melt, for example the precrystalliser 1 or 20 according to FIG. 1 or FIG. 3, and a device for producing granules from the crystal slurry supplied from the precrystalliser 1. The supply container 31 and the precrystalliser 1, 20 are connected to one another by means of a pipeline 35. A pump 34 in the pipeline 35 transports the melt from the supply container 31 to the inlet 5 of the precrystalliser 1, 20. The overflow 6 of the precrystalliser 1, 20 is connected via a pipeline 36 to the supply container 31. A further pipeline 37 connects the outlet 7 of the precrystalliser to the device for producing the granules. The crystal slurry is conveyed with the aid of a pump 38 arranged in the pipeline 37. It will be understood that the pipelines 35, 36 and 37 can be heated in order to prevent the pipelines becoming clogged. The device for producing granules can be, for example, a cooling belt to which the crystal slurry is applied in portions and on which the crystal slurry crystallises out by cooling. The device is preferably a prill tower 32, however. In the prill tower 32 the inoculated melt S provided with seed crystals, in the form of a crystal slurry, is sprayed or introduced dropwise into a current of gas 39. The current of gas 39 can be a cooled current of air but, if necessary, it is also possible to use a (cooled) inert gas. The drops crystallise during their free-fall descent. The granules so produced are discharged at the base of the tower. The exhaust gas is conveyed, for example, to a cyclone 33 in which the remaining granules are separated from the current of gas.

In the spatial arrangement of the supply container 31 and the precrystalliser 1, 20 care is preferably taken that the supply container 31 is arranged at a lower level than is the outlet opening 7 of the precrystalliser 1, 20. As a result of that arrangement it is very easily possible to regulate the level of the melt in the precrystalliser 1, 20. The pump 34 in the pipeline 35 which connects the supply container 31 and the inlet 5 of the precrystalliser 1, 20 is operated at a pumping rate approximately 1% to approximately 10% greater than the pumping rate of the pump 38 in the outlet pipeline 37. The precrystalliser 1, 20 is in this manner filled with melt until the level reaches the height of the overflow 6. Excess melt then runs off via the overflow 6 into the pipeline 36. Because the supply container 31 is arranged at a lower level than is the precrystalliser 1, 20, an additional pump for transporting the excess melt back into the supply container 31 is unnecessary. In this simple manner it is ensured that once a maximum level of melt has been reached in the precrystalliser 1, 20, that level is maintained during operation.

In an alternative mode of operation, when the crystal slurry is to be transported in a pressure-free manner from the precrystalliser 1, 20 to a granulating device, for example to a cooling belt, the overflow 6 can be connected via the pipeline 36 to tile inlet opening of the cooling belt which is arranged at a lower level. In this variant of operation, the outlet 7 in the vessel base of the precrystalliser 1, 20 can likewise be connected to the inlet opening of the cooling belt arranged below. It could, however, also be connected to the supply container, so that the crystal/melt mixture located below the level of the overflow can pass back into the supply container 31.

The use of a prill tower as a granulation system is desirable because it allows a very large quantity of granules to be produced in a relatively short period of time. In addition, a prill tower allows the production of fine granules of small particle sizes with a very low degree of variation in product quality and a low dust content. The use of prill towers has been limited hitherto by the shortness of the descent time of the melt in the prill tower during which time the product had to be crystallised. Especially in the case of products of high molecular weight (for example molecular weight>300), the period of time required for the seed formation prior to crystallisation is very long, so that the descent time in a prill tower was generally insufficient. By the upstream arrangement of an apparatus according to the invention for producing seed crystals in the melt, a desired degree of precrystallisation of the product melt can be obtained in the precrystalliser so that now many products of high molecular weight can also be crystallised in a short time and in large amounts in a prill tower.

The apparatus according to the invention is of relatively simple construction. The scraping unit has only a single bearing, which ensures relatively low susceptibility to wear. It is unnecessary to provide additional by-pass lines in order to obtain sufficient circulation of the melt, so that the amount of space required for the apparatus is also relatively small. The vessel is not subject to any special structural requirements and may be a modified stirring vessel. The overall result is a structurally relatively simple solution which requires little space and is economical to produce.

What is claimed is:

1. An apparatus for producing seed crystals comprising a closed cylindrical vessel which is vertically arranged and has a vessel wall, an openable vessel lid, and a vessel base enclosing a vessel volume, said vessel having at least one inlet opening for the melt and at least one outlet opening for an inoculated melt provided with seed crystals, said vessel wall being provided with a cooling region which is constructed as an annular cooling surface above said vessel base, and further comprising a motor-driven rotatable scraping unit arranged in said vessel and having at least one scraping arm which moves over the wall and which during operation sweeps along the inner wall of said vessel; said scraping unit comprising a motor-driven rotating shaft which extends vertically through said vessel in the direction of said vessel base, has a lower end that is located just shortly above said vessel base, said lower end being connected with a scraping arm which extends first parallel to said vessel base towards said vessel wall and thence parallel with respect to said annular cooling surface and axially parallel to said rotating shaft, said scraping arm being provided in a vertical region opposite said cooling surface with at least one scraping blade which during operation cuts along said inner wall of said vessel in the region of said cooling surface; said scraping unit being heatable.

2. An apparatus according to claim 1, wherein said scraping unit is hollow and is constructed for the supply and removal of a heating medium.

3. An apparatus according to claim 2, wherein said scraping unit is constructed in the form of a scraping anchor, comprising two hollow scraping arms which are located opposite one another and, starting from the lower end of said shaft close to said vessel base, extend first in the direction towards said vessel wall and thence parallel to said annular cooling surface and axially parallel to said rotating shaft and, each of said hollow scraping arms being provided in the regions opposite said cooling surface with several scraping blades, which are arranged with a spacing one below the other, said scraping blades being adjustable relative to said cooling surface and during operation cutting along said inner wall of said vessel in the region of said cooling surface.

4. An apparatus according to claim 3, wherein said rotating shaft of said scraping unit is constructed in the form of a double-walled pipe having an axial inner channel and an outer annular channel surrounding the latter; said inner channel being connected to one of said hollow scraping arms; said hollow scraping arms having upper ends which are connected to a hollow connection piece; and said second hollow scraping arm being connected to said outer annular channel of said double-walled pipe, it being possible to introduce a heating medium through said inner channel into said scraping unit, to circulate the heating medium through one hollow scraping arm, said hollow connection piece and said other hollow scraping arm, and finally to remove said heating medium again from said scraping unit through said outer annular channel of said double-walled pipe.

5. An apparatus according to claim 1, wherein said scraping unit has more than one scraping arm, said more than one scraping arms being distributed around the circumference at the lower end of said shaft close to said vessel base.

6. An apparatus according to claim 1, wherein a pipe extends through said vessel from said inlet for said melt, which pipe has its mouth above said scraping arm and a heatable wall.

7. An apparatus according to claim 1, wherein there is provided inside said vessel a heatable turbine agitator which extends approximately axially parallel to said scraping unit towards said vessel base and ends shortly above it.

8. An apparatus according to claim 1, wherein said vessel base and regions of said vessel above said annular cooling region are heatable.

9. An apparatus according to claim 8, wherein said heatable regions of said vessel are clad with heating jackets which are preferably kept at a desired temperature with a liquid heating medium, and wherein said cooling regions are surrounded by a cooling jacket.

10. An apparatus according to claim 8, wherein said vessel is provided with a double-walled jacket, and a heating medium can be conducted into heating zones of said vessel between an inner wall and an outer wall of said double-walled jacket, and wherein a cooling medium can be conducted into cooling zones of said vessel, preferably being guided by guide plates provided between said walls.

* * * * *